Patented Nov. 18, 1947

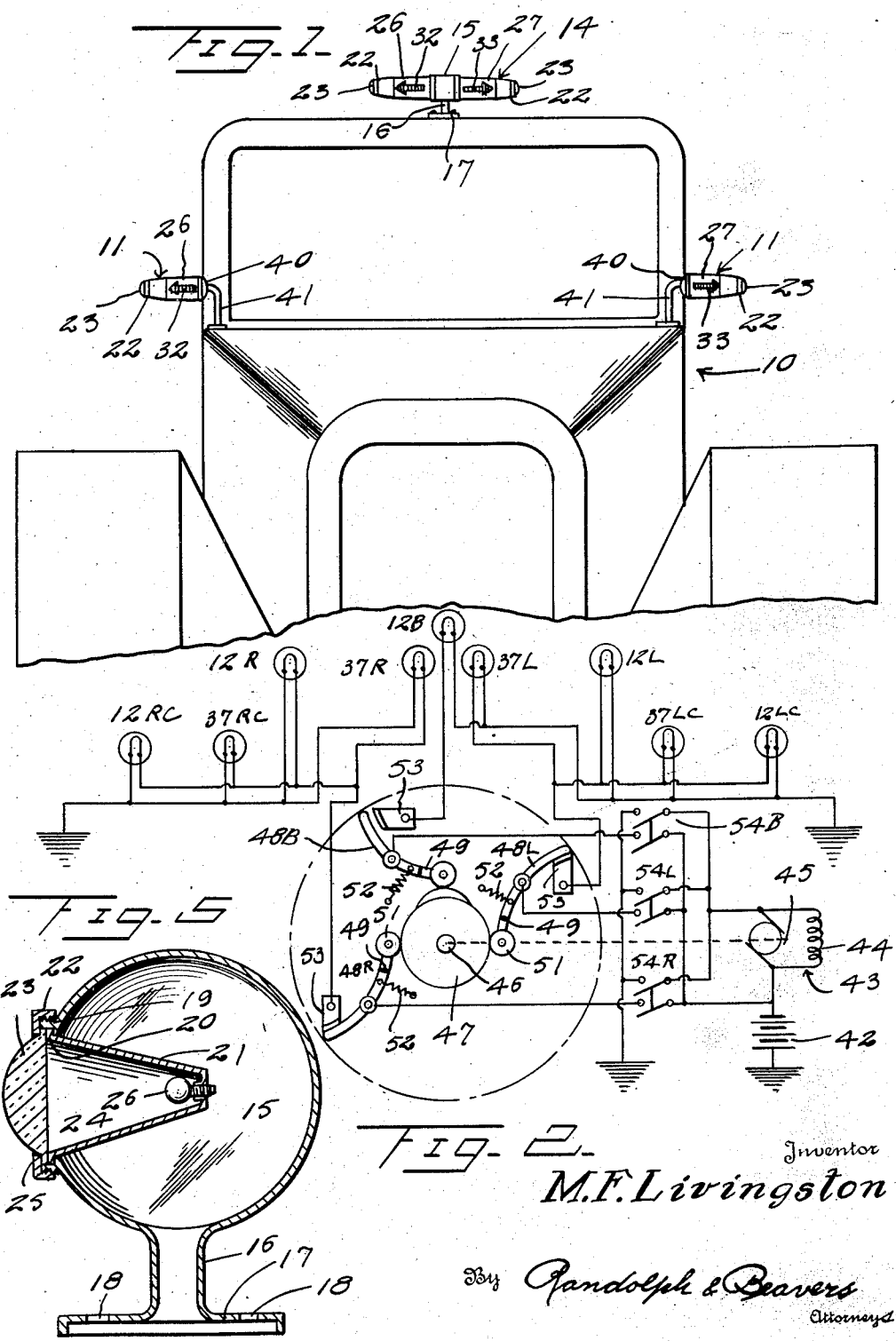

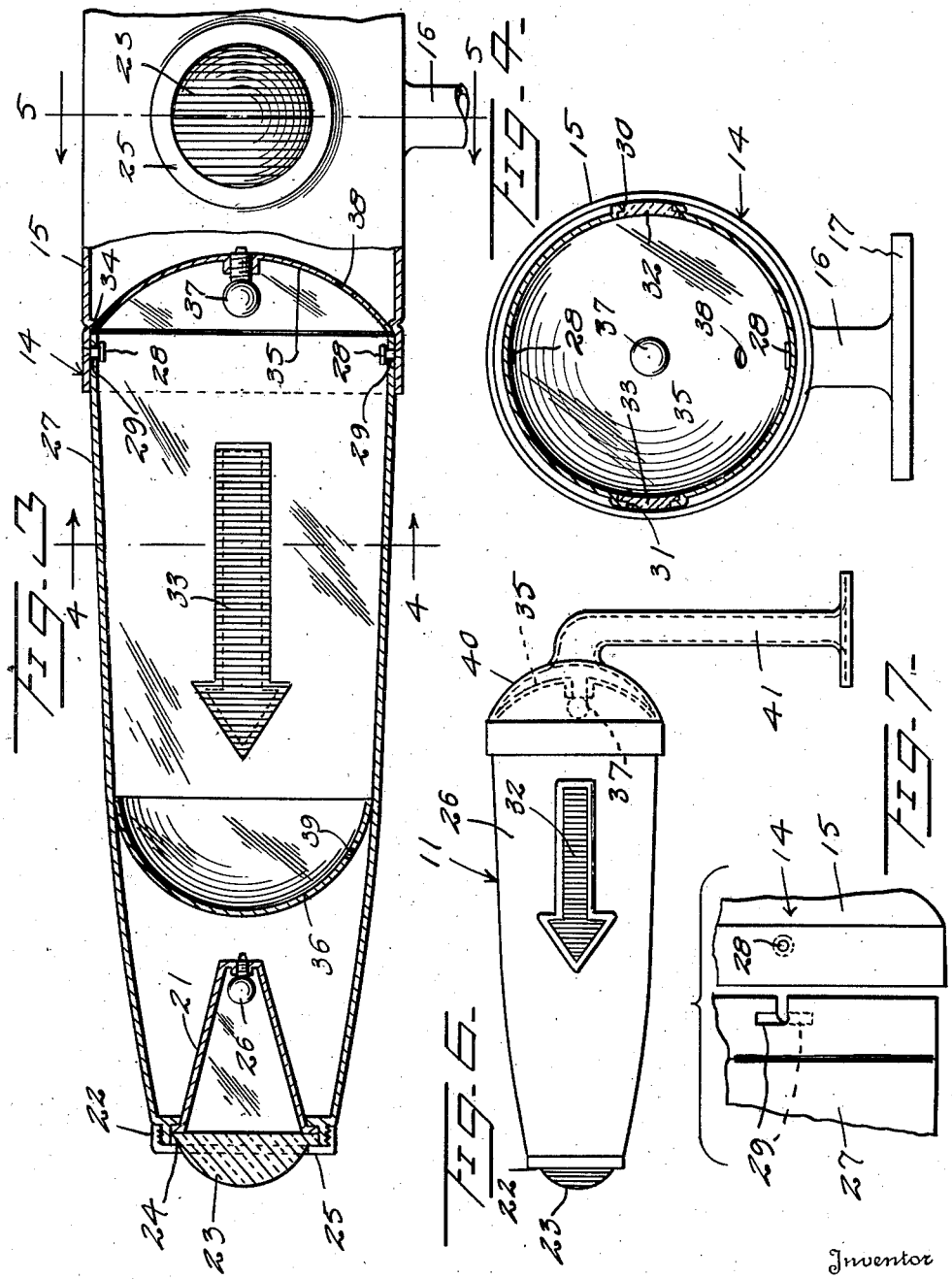

2,431,129

UNITED STATES PATENT OFFICE 2,431,129

TRAFFIC SIGNAL FOR MOTOR VEHICLES

Mancill F. Livingston, Prophetstown, Ill.

Application May 2, 1945, Serial No. 591,622

3 Claims. (Cl. 177—329)

This invention relates generally to indicating devices for automobiles, trucks, and like motor vehicles whereby the operator thereof may indicate or signal the intended movements of his vehicle to the operators of other vehicles moving relatively thereto, thereby avoiding confusion and minimizing accidents ordinarily concurrent with the operation of motor vehicles, particularly under congested traffic conditions.

More specifically, the present invention is directed to the provision of new and improved signalling devices for a motor vehicle, which devices may be controlled from the operator's station and provide signals which are visible from all angles of the vehicle simultaneously and discernible in all kinds of weather during the day and night.

Among other objects of the invention is the provision of a unitary signal lamp structure which may be used to signal movement of the vehicle to the left or right or to indicate backing-up movement thereof, whichever the case may be.

Still other objects of the invention are those implied from or inherent in the novel construction, combination and arrangement of the parts hereinafter to be described in detail, reference being had to the accompanying drawings in which:

Figure 1 is a view in elevation of an automobile employing the signal devices of the present invention;

Figure 2 illustrates diagrammatically an electrical circuit suitable for use with the signalling devices shown in Figure 1;

Figure 3 is an enlarged rear elevation, partly in section and partially disassembled, of the signalling device shown mounted on the top of the vehicle in Figure 1, Figure 4 is a sectional view taken along the line 4—4 of Figure 3;

Figure 5 is a sectional view taken along the line 5—5 of Figure 3;

Figure 6 is an enlarged view in elevation of the signalling device attached to the right side of the vehicle in Figure 1; and Figure 7 is a detail view illustrating the bayonet joint employed in the signalling devices.

Referring now to the drawings and more particularly to Figure 1 thereof, the numeral 10 generally designates an automobile having a pair of signal devices 11 of the present invention secured to the cowl thereof in the manner of cowl lights or lamps, one each of the signalling devices being secured to opposite sides of the vehicle and extended laterally therefrom whereby arrows displayed by the devices may be seen from the front or rear of the vehicle, thereby to indicate intended turning movements thereof. The end of each device 11 is also provided with a convex lens 23 through which light is emitted when the arrows are illuminated, thereby rendering the device discernible from substantially all angles, the light preferably being flashed on and off by means hereinafter to be described.

If desired, the functions of the signalling device 11 may be provided by a unitary signalling device 14 which is designed for mounting on the vehicle preferably centrally and at the highest point thereof in order to be detected immediately by the operators of other vehicles when signals are flashed therefrom. It will be understood, however, that the positions for the devices 11 and 14 suggested herein are merely for the purpose of illustrating the applicability of the devices to a motor vehicle in a manner to accomplish satisfactorily the desired functions of the devices, it further being understood, both devices may be employed in the manner suggested, or either of them may be used on the fenders of the vehicle or elsewhere thereon, in any manner best adapted to suit the design of the vehicle or to promote the advantages afforded by the signalling devices. As between the devices 11 and 14, signal 14 affords an additional feature not provided by the devices 11 in that the central portion of signal device 14 is utilized to provide a "backing-out" signal which may be seen from the rear of the vehicle only.

Referring now to Figures 3 through 5, it will be seen that the signal device 14 comprises a central tubular portion or casing 15 having a laterally extending tubular portion 16 which terminates in a substantially flat portion 17 having suitable openings 18 for receiving screws or the like whereby the device may be secured to the vehicle.

Tubular portion 15 is also opened laterally to provide an externally threaded flange 19 which is formed internally to provide a shoulder 20 against which a conical reflector 21 is retained by means of the threaded washer 22, a convex shaped lens 23 having a flange 24 being interposed between the washer and reflector whereby the lip 25 of the washer forces the flange 24 against the reflector which is in turn forced against the shoulder as the washer is tightened on the flange, thus providing a simple and effective structure which readily may be assembled and disassembled when it becomes necessary to replace the electric bulb 26 which is carried in the base of the reflector in any conventional manner.

Removably secured to the ends of casing 15 as by bayonet joints is a pair of identical tapered tubular members 26 and 27, each of which members is telescopingly received into casing 15 and terminates on the other end thereof in a lens assembly which may be identical to that formed with flange 19 on casing 15, the bayonet joints comprising pins 28 riveted to casing 15 and adapted to enter L-shaped slots 29 provided therefor in members 26 and 27.

Diametrically disposed, flanged or offset openings 30 and 31 in the form of arrows are provided in the side walls of each of members 26 and 27 to receive interfittingly therewith flanged windows or lenses 32 and 33 respectively, the windows being secured in the offset openings as by cementing them therein or otherwise suitably securing the parts together, and the windows preferably being formed arcuately with the members 26 and 27, substantially as shown. It will be understood that arrows 32 and 33 must point in opposite directions with respect to the associated member 26 or 27 individual thereto in order that the arrows point in the same direction when signalling device 14 is viewed either from the front or the rear of the vehicle to which it is attached. However, notwithstanding this requirement, it will be apparent that assemblies 26 and 27 may be identical and, therefore, interchangeable, thus providing a simple arrangement which may be manufactured expeditiously and at low cost.

Casing 15 on each end thereof is crimped circumferentially to provide a shoulder at 34 which serves to retain a reflector 35 in the position shown when member 26 is attached to the casing 15. Reflector 35, together with a reflector 36 secured within member 27, Figure 3, as by being welded or soldered thereto, define an illumination chamber for the windows 32 and 33, the walls of the chamber preferably being provided with reflecting surfaces whereby an intense beam of light is projected through the windows from an electric bulb 37 carried at the base of reflector 35 in any conventional manner. The nicety of the cylindrical reflecting surface afforded by the tubular members 26 and 27 in concentrating the light at the windows will be readily appreciated. Suitable holes 38, 39 are provided in reflectors 35, 36 respectively for accommodating the electrical wiring between the bulbs and the light flashing and control means, the wires conveniently being extended through the tubular portion of bracket 16 into openings provided therefor in the vehicle.

The lenses 23 and windows 32 and 33 may be formed of any transparent and colored material suitable for the purpose, preferably red glass.

The signalling devices 11 generally are similar in construction to signal 14 except that the assemblies including members 26 and 27 are each supported separately by a cup-shaped member 40 having a tubular bracket 41 preferably formed integrally therewith, member 40 and its associated bracket portion 41 otherwise being the equivalent functionally of the bracket comprising members 16 and 17.

The operation of signal devices 11 and 14 and the means for flashing and controlling the lights thereof best may be understood from a consideration of Figure 2 wherein the electrical circuit of the signal system is diagrammatically illustrated and wherein 12B designates the electric bulb used in the "backing-out" signal; 12R and 12L designate the bulbs employed in the ends of members 26 and 27 respectively; 12RC and 12LC designate the bulbs employed in the right and left hand cowl signals 11 respectively; 37R and 37L designate the bulbs used respectively in members 26 and 27, and 37RC and 37LC designate the bulbs employed respectively in the cowl signals 11 mounted on the right and left sides of the vehicle.

42 designates the storage battery of the vehicle which is utilized to supply electrical energy to the bulbs and to a small D. C. motor 43 used to interrupt the flow of energy to the bulbs. Motor 43 comprises a field winding 44 and an armature 45 including a shaft 46. A cam 47 is secured to the shaft for rotation therewith and is arranged to actuate three identical rocker arms 48B, 48R and 48L sequentially as the shaft rotates, each of the rocker arms being provided with a roller 51 for facilitating the operation thereof and a bias spring 52 for yieldably urging the roller into contact with the cam and also for urging the other extremity of the rocker arm into engagement with a coacting switch member 53. Suitable insulating material is provided between the roller and switch ends of each rocker arm, as at 49.

54B, 54R and 54L designate identical double pole, single throw switches which are employed selectively to energize the right or left turning signals or the "backing-up" signal and simultaneously to set the D. C. motor 43 in operation, the switches conveniently being located on the dash board, for example, or elsewhere at the operator's station.

Thus, when a right turn is about to be made, switch 54R is closed. This sets motor 43 in operation by way of an obvious circuit including battery 42, motor 43, switch 54R, and thence to ground potential at the other side of the battery. With the motor in operation, rocker arm 48R operates intermittently to break the circuit to bulbs 12R, 12RC, 37R and 37RC, the circuit otherwise being closed and including battery 42, switch 54R, rocker arm 48R and coacting switch member 53, bulbs 12R, 12RC, 37R and 37RC in parallel, and thence to ground potential at the other side of the battery. In like manner, bulbs 12L, 12LC, 37L and 37LC are flashed when switch 54L is closed preparatory to making a left turn, and bulb 12B is flashed when switch 54B is closed preparatory to backing up the vehicle.

The interior side of the illuminating chamber is of reflecting material and it is to be understood that the convex lens 23 must be of glass in the backing out signal and in the end of each of the other signals. These lens members are held in the manner shown and described or in some other suitable manner.

From the foregoing, the operation of invention, and the advantages afforded in the use thereof, and the economies which may be promoted in the manufacture thereof, should now be apparent. However, while the invention has been described in particularity with respect to certain preferred embodiments thereof which give satisfactory results, it will be obvious to those skilled in the art that further embodiments and modifications thereof may be made without departing from the spirit and scope of the invention as defined by the appended claims.

I claim as my invention:

1. In a signalling device adapted to indicate intended backing-up or right or left turning movements of an automotive vehicle, the combination of a tubular member having bracket means for attaching the same to the vehicle, a lamp assembly including a reflector, bulb, and lens mounted in the side wall of said tubular member and adapted to be seen from the rear of the vehicle when the bulb is lighted, a pair of tapered tubular members removably secured to the ends respectively of said first named tubular member, each of said tapered tubular members having a lamp assembly similar to the aforesaid lamp assembly disposed in the opposite end thereof, each of said tapered tubular members having an illumination chamber defined by a pair of spaced reflectors disposed therein, and each of said tapered tubular members having formed within said chamber diametrically disposed transparent windows in the form of oppositely directed arrows adapted to indicate the same turning movement of the vehicle whether viewed from the front or rear thereof.

2. In a signalling device adapted to indicate intended backing-up or right or left turning movements of an automotive vehicle, the combination of a first tubular member having a bracket for securing the same to the vehicle, a lamp assembly disposed in the wall of the tubular member and adapted to be seen from the rear of the vehicle, second and third tubular members adapted to be received telescopingly in the ends of said first tubular member respectively, a pair of bayonet joints for detachably assembling said tubular members as a unitary device, a lamp assembly disposed in the opposite end of each of said second and third tubular members and adapted to be viewed from the sides of the vehicle respectively each of said first and second tubular members, having an illumination chamber defined by a pair of reflectors disposed in spaced relation therein, and each said chamber having diametrically disposed windows in the form of oppositely directed arrows adapted to indicate a particular turning movement of the vehicle whether viewed from the front or rear thereof.

3. In a signalling device adapted to indicate a particular turning movement of an automotive vehicle, combination of a first tubular member including a bracket for mounting the same on the vehicle, a second tubular member secured telescopingly to the first tubular member, a lamp assembly including a convex lens disposed in the opposite end of said second tubular member, said second tubular member having an illumination chamber defined by a pair of reflectors disposed in spaced relation therein, and said chamber having diametrically disposed windows in the form of oppositely directed arrows adapted to indicate said particular turning movement of the vehicle whether viewed from the front or rear thereof, and circuit means for said illumination chamber and said lamp assembly for illuminating the same simultaneously whereby said turning movement may be indicated also by the lamp assembly.

MANCILL F. LIVINGSTON.

REFERENCES CITED

The following references are of record in the file of this patent:

UNITED STATES PATENTS

| Number | Name | Date |
|---|---|---|
| 1,169,941 | Edwards et al. | Feb. 1, 1916 |
| 1,294,527 | Olmsted | Feb. 18, 1919 |
| 1,349,063 | Gordon et al. | Aug. 10, 1920 |
| 1,732,165 | Kelly | Oct. 15, 1929 |
| 1,796,694 | Silva | Mar. 17, 1931 |
| 1,848,685 | Wyatt | Mar. 8, 1932 |
| 1,865,777 | McManaman | July 5, 1932 |
| 2,005,963 | Axelberg | June 25, 1935 |